US011513326B2

(12) United States Patent
Lin et al.

(10) Patent No.: US 11,513,326 B2
(45) Date of Patent: Nov. 29, 2022

(54) CATADIOPTRIC OPTICAL SYSTEM

(71) Applicant: National Applied Research Laboratories, Taipei (TW)

(72) Inventors: Sheng-Feng Lin, Taipei (TW); Chia-Ray Chen, Taipei (TW); Tien-Chun Kuo, Taipei (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 214 days.

(21) Appl. No.: 17/136,935

(22) Filed: Dec. 29, 2020

(65) Prior Publication Data

US 2021/0208376 A1 Jul. 8, 2021

(30) Foreign Application Priority Data

Jan. 2, 2020 (TW) ................................ 109100006

(51) Int. Cl.
*G02B 17/08* (2006.01)

(52) U.S. Cl.
CPC ...... *G02B 17/0896* (2013.01); *G02B 17/0808* (2013.01); *G02B 17/0876* (2013.01)

(58) Field of Classification Search
CPC ............... G02B 17/08; G02B 17/0804; G02B 17/0808; G02B 17/082; G02B 17/0836; G02B 17/084; G02B 17/0876; G02B 17/0896

See application file for complete search history.

(56) References Cited

U.S. PATENT DOCUMENTS

| | | | |
|---|---|---|---|
| 5,089,910 A * | 2/1992 | Sigler | G02B 17/0856 359/728 |
| 6,222,683 B1 * | 4/2001 | Hoogland | G02B 13/06 359/725 |
| 7,236,297 B1 * | 6/2007 | Ackermann | G02B 17/0808 359/399 |
| 10,261,297 B2 * | 4/2019 | Cappiello | G02B 7/182 |

(Continued)

FOREIGN PATENT DOCUMENTS

| | | | |
|---|---|---|---|
| CN | 102385158 B | * | 4/2013 |
| CN | 103345062 A | * | 10/2013 |
| CN | 105182505 A | * | 12/2015 |

(Continued)

*Primary Examiner* — Christopher Stanford
(74) *Attorney, Agent, or Firm* — Birch, Stewart, Kolasch & Birch, LLP

(57) ABSTRACT

A catadioptric optical system in sequence of ray tracing comprises a first mirrors group of Ritchey-Chrétien type hyperbolic mirrors with positive diopter including a concave primary mirror having a central through hole and a convex secondary mirror, a second corrector lens group with negative diopter positioned at the image-side of the first mirrors group including a first meniscus lens element having positive refractive power and a convex object-side surface, a second lens element having negative refractive power and biconcave surfaces, a third meniscus lens element having negative refractive power and a concave object-side surface, and a fourth lens element having positive refractive power and biconvex surfaces. The infinite conjugate beams of incident light within field of view pass through the catadioptric optical system to become a corrected beam having a small CRA angle.

10 Claims, 3 Drawing Sheets

(56) References Cited

U.S. PATENT DOCUMENTS

2004/0246595 A1 * 12/2004 Beach .................... G02B 23/06
359/728

FOREIGN PATENT DOCUMENTS

| DE | 19640327 A1 | * | 3/1998 | ......... G02B 17/0808 |
| JP | H07168099 A | * | 7/1995 | |
| JP | 2018091956 A | * | 6/2018 | |

* cited by examiner

CATADIOPTRIC OPTICAL SYSTEM

BACKGROUND OF THE INVENTION

Field of the Invention

The present invention relates to a catadioptric optical system, and more particularly to a catadioptric telescope system for satellite remote-sensing images.

Description of the Prior Art

Satellite remote-sensing images can demonstrate an overview of a large-range land profile to help learn various topographies, such as mountains, plains, basins, coastlines, cities, rivers and roads, etc. Besides, disaster regions, for example landslide/landslip areas, mudslide areas, wildfire areas, etc. can be quickly identified and plotted in the image maps by virtue of comparison and analysis of the satellite remote-sensing images captured before and after natural or human disasters. The satellite remote-sensing images not only help people master the situation in time, but also provides accurate information to help find out reasons arising the disasters. The optical remote-sensing carrier of an artificial satellite is primarily composed of three subsystems including a remote-sensing instrument (RSI), a focal plane array (FPA) and an electronic unit (EU). The RSI is a large space-grade telescope. The catadioptric Cassegrain telescope is employed for a classical telescope, while the modern different telescope mostly utilizes the reflecting Ritchey-Chrétien telescope to alleviate off-axis aberration. The sun light reflected from the earth enters the optical remote-sensing payload located on the assignment of space orbit, then in sequence reflected by a primary mirror and a secondary mirror, then passing a corrector lens group and then focusing on an image sensing device of the FPA to transform to digital electronic signals.

A typical image sensing device is equipped with a micro-lens on each pixel to increase luminous flux received by its imaging surface in order that the pixel can become an effective pixel area. The micro-lens elements are easily affected and deformed by radiation and extreme variations of temperature in space environment, and even deteriorate image quality of the image sensing device. So, the image sensing device of the optical RSI has not a micro-lens on each pixel. As the incident angle of light increases, the luminous flux of the incident light received by the effective pixel area is diminished. As a consequence, the brightness contrast between the central area and the off-axis area of the pixel is decreased to unfavorably influence the image quality of the image sensing device. Once the images outputted from the image sensing device is required to be stitched to form a whole image, dark stripes would appear on the whole image.

SUMMARY OF THE INVENTION

The present invention provides a catadioptric optical system which can be served as a catadioptric telescope, particularly as a Ritchey-Chrétien type telescope. Incident light passing through the present catadioptric optical system becomes corrected beams having small CRAs (Chief Ray Angles). When the corrected beams having small CRAs project onto an image sensing device, each pixel area of the image sensing device receives uniform luminous flux, and hence the relative illumination of an image quality from the image sensing device is increased.

In various implements, the present invention provides a catadioptric optical system, comprising in sequence of ray tracing: a first mirrors group of Ritchey-Chrétien type hyperbolic mirrors with positive diopter including a concave primary mirror having a central through hole and a convex secondary mirror; and a second corrector lens group with negative diopter positioned at an image side of the first mirrors group and from the image side of the first mirrors group in order including a first meniscus lens element having positive refractive power and a convex object-side surface, a second lens element with negative refractive power having a concave object-side surface and a concave image-side surface, a third meniscus lens element having negative refractive power and a concave object-side surface, and a fourth lens element with positive refractive power having a convex object-side surface and a convex image-side surface; wherein a diopter of the whole catadioptric optical system is DW, a diopter of the second corrector lens group is DL, and the following condition is satisfied:

$$\frac{DL}{DW} = (P_4 EFL^4 + P_3 EFL^3 + P_2 EFL^2 + P_1 EFL + P_0) * (1 \pm 10\%);$$

wherein, $P_0 = -4.95 * 10^{-1}$, $P_1 = -1.81 * 10^{-3}$, $P_2 = 5.59 * 10^{-7}$, $P_3 = -7.76 * 10^{-11}$, $P_4 = 4.4 * 10^{-15}$, EFL is an effective focal length of the present catadioptric optical system, and (±10%) means a tolerance allowance range of the present catadioptric optical system under an actual measure.

According to various implements of the present invention, the first lens element is constituted of a singular lens element and has an image-side surface being concave.

According to various implements of the present invention, the third lens element is constituted of a singular lens element and has an image-side surface being convex.

According to various implements of the present invention, a diopter of the first lens element is DL1, a diopter of the second lens element is DL2, a diopter of the third lens element is DL3, a diopter of the fourth lens element is DL4, and the following conditions are satisfied:

$$\frac{DL1}{DL} = (K_4 EFL^4 + K_3 EFL^3 + K_2 EFL^2 + K_1 EFL + K_0) * (1 \pm 10\%);$$

wherein, $K_0 = -3.32$, $K_1 = 1.23 * 10^{-3}$, $K_2 = -3.86 * 10^{-7}$,

-continued $K_3 = 5.68 * 10^{-11}$, $K_4 = -3.56 * 10^{-15}$, $$\frac{DL2}{DL} = (L_4 EFL^4 + L_3 EFL^3 + L_2 EFL^2 + L_1 EFL + L_0) * (1 \pm 10\%);$$

wherein, $L_0 = 9.82$, $L_1 = -4.91 * 10^{-4}$, $L_2 = -2.48 * 10^{-7}$, $L_3 = 7.24 * 10^{-11}$, $L_4 = -3.11 * 10^{-15}$, $$\frac{DL3}{DL} = (M_4 EFL^4 + M_3 EFL^3 + M_2 EFL^2 + M_1 EFL + M_0) * (1 \pm 10\%);$$

wherein, $M_0 = 2.74$, $M_1 = 1.32 * 10^{-3}$, $M_2 = -8.02 * 10^{-7}$, $M_3 = 1.53 * 10^{-10}$, $M_4 = -9.43 * 10^{-15}$, $$\frac{DL4}{DL} = (N_4 EFL^4 + N_3 EFL^3 + N_2 EFL^2 + N_1 EFL + N_0) * (1 \pm 10\%);$$

wherein, $N_0 = -5.99$, $N_1 = -1.52*10^{-3}$, $N_2 = 1*10^{-6}$, $N_3 = -1.95*10^{-10}$, $N_4 = 1.11*10^{-14}$, EFL is an effective focal length of the present catadioptric optical system, and (±10%) means a tolerance allowance range of the present catadioptric optical system under an actual measure.

According to various implements of the present invention, a composite diopter of the first lens element and the second lens element is DL12, a composite diopter of the second lens element and the third lens element is DL23, and a composite diopter of the third lens element and the fourth lens element is DL34, and the following conditions are satisfied:

$$\frac{DL12}{DL} = (R_4 EFL^4 + R_3 EFL^3 + R_2 EFL^2 + R_1 EFL + R_0) * (1 \pm 10\%);$$

wherein, $R_0 = 6.05$, $R_1 = -2.7 * 10^{-4}$, $R_2 = -1.43 * 10^{-7}$, $R_3 = 4.21 * 10^{-11}$, $R_4 = -1.66 * 10^{-15}$, $$\frac{DL23}{DL} = (S_4 EFL^4 + S_3 EFL^3 + S_2 EFL^2 + S_1 EFL + S_0) * (1 \pm 10\%);$$

wherein, $S_0 = 11.7$, $S_1 = 2.38 * 10^{-3}$, $S_2 = -1.74 * 10^{-6}$, $S_3 = 3.46 * 10^{-10}$, $S_4 = -1.98 * 10^{-14}$, $$\frac{DL34}{DL} = (T_4 EFL^4 + T_3 EFL^3 + T_2 EFL^2 + T_1 EFL + T_0) * (1 \pm 10\%);$$

wherein, $T_0 = -4.23$, $T_1 = 1.66*10^{-4}$, $T_2 = 1.16*10^{-7}$, $T_3 = -3.25*10^{-11}$, $T_4 = 1.2*10^{-15}$, EFL is an effective focal length of the present catadioptric optical system, and (±10%) means a tolerance allowance range of the present catadioptric optical system under an actual measure.

According to various implements of the present invention, the first lens element, the second lens element, the third lens element and the fourth lens element are made of the same optical material.

According to various implements of the present invention, the first lens element, the second lens element, the third lens element and the fourth lens element are made of glass material, a refractive index of the glass material is nd, an Abbe number of the glass material is y d, and the following conditions are satisfied:

$1.44 < nd < 1.47$; and $64.41 < vd < 71.19$.

According to various implements of the present invention, the present catadioptric optical system further comprises a third reflective surfaces group and a fourth image sensing group, wherein the third reflective surfaces group is positioned at an image side of the second corrector lens group and includes a first reflective surface and a second reflective surface, a contained angle is between the first reflective surface and the second reflective surface, an apex of the contained angle is positioned at an optical axis of the catadioptric optical system and faces toward the second corrector lens group, the fourth image sensing group includes a first image sensing device and a second image sensing device respectively placed at an image side of the first reflective surface and an image side of the second reflective surface.

According to various implements of the present invention, a distance on the optical axis between the convex object-side surface of the first lens element facing toward the convex secondary mirror and the convex image-side surface of the fourth lens element facing toward the third reflective surfaces group is TLL1L4, and the following condition is satisfied:

$$TLL1L4 = (U_4 EFL^4 + U_3 EFL^3 + U_2 EFL^2 + U_1 EFL + U_0) * (1 \pm 10\%);$$

wherein, $$U_0 = -2.85 * 10^2,$$

$$U_1 = 3.87 * 10^{-1},$$

$$U_2 = -1.37 * 10^{-4},$$

$$U_3 = 2.23 * 10^{-8},$$

$$U_4 = -1.28 * 10^{-12},$$

EFL is an effective focal length of the present catadioptric optical system, and ($\pm 10\%$) means a tolerance allowance range of the present catadioptric optical system under an actual measure.

According to various implements of the present invention, a chief ray angle of a corrected beam of the incident light corrected through the catadioptric optical system is CRA, and the following condition is satisfied:

$$CRA < 3.5 \text{ degrees.}$$

DETAILED DESCRIPTION OF THE PREFERRED EMBODIMENTS

The present catadioptric optical system is a catadioptric telescope comprising Ritchey-Chrétien type primary and secondary hyperbolic mirrors, four elements corrector lens group and a reflective surfaces group. The infinite conjugate beams of incident light falling on the primary mirror, converging to the secondary mirror are reflected, then passing and being corrected through the corrector lens group to become corrected beams having small chief ray angles. The corrected beams having small chief ray angles are reflected by the reflective surfaces group and then focused unto image sensing devices, correspondingly.

The present catadioptric optical system will be described in detail according to the following embodiment accompanying with the appended drawings.

Figure 1A:
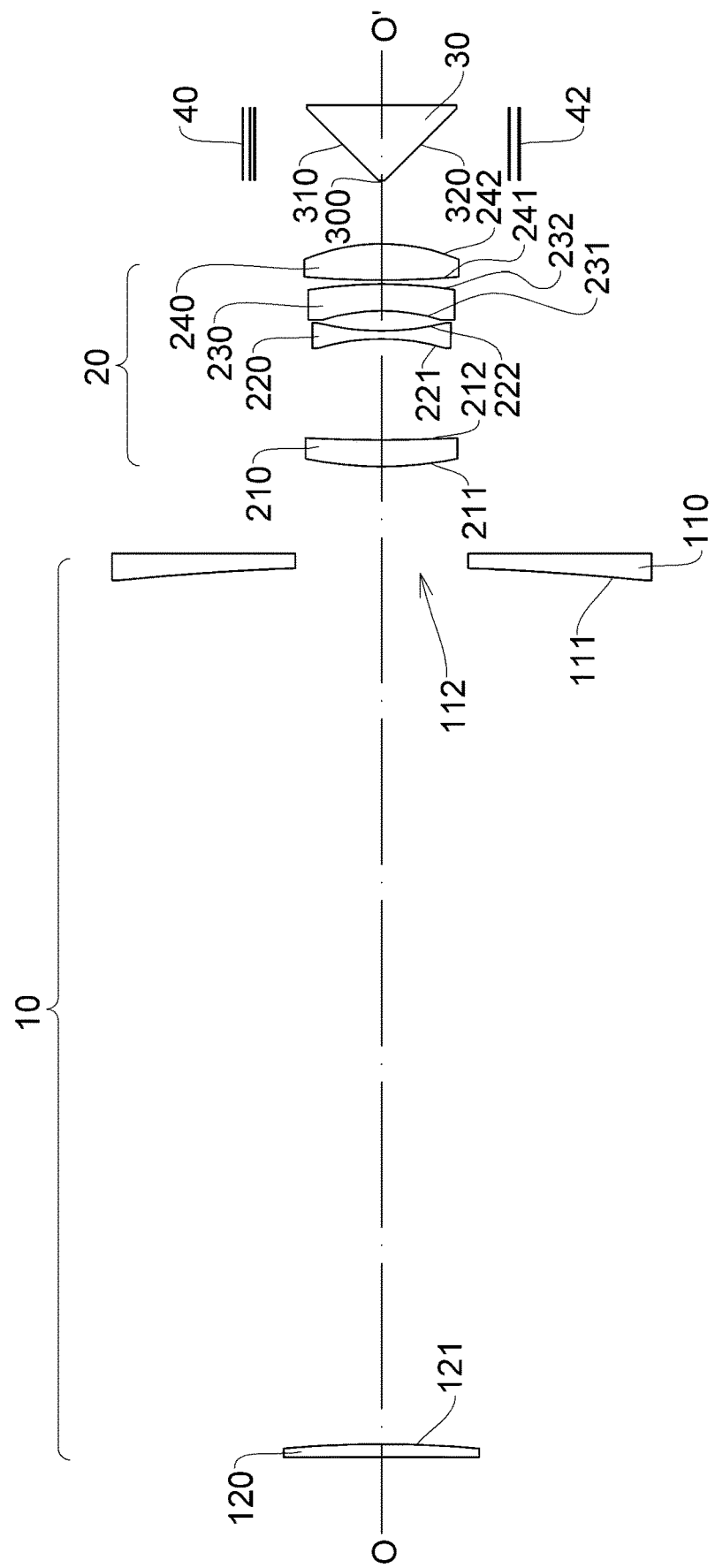
FIG. 1A is a schematic view of a catadioptric optical system according to an embodiment of the present invention.
Figure 1B:
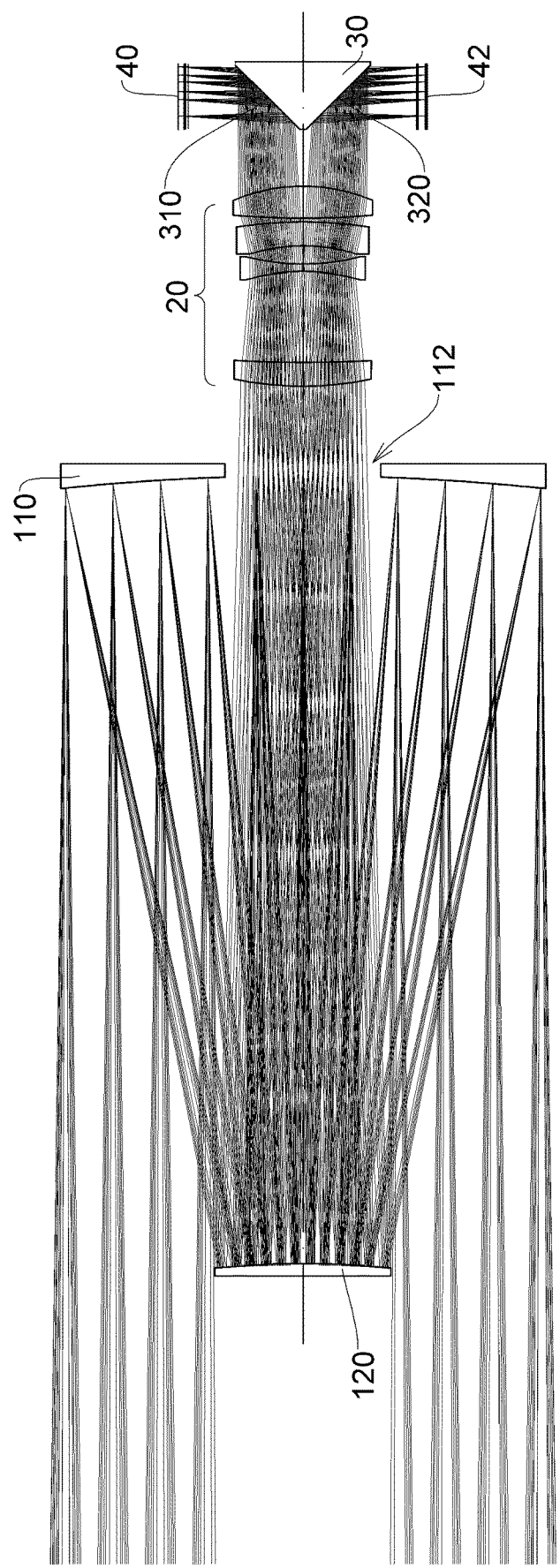
FIG. 1B schematically shows ray tracing of incident light within the catadioptric optical system of FIG. 1A.

FIG. 1A shows a schematic view of a catadioptric optical system according to an embodiment of the present invention, and FIG. 1B schematically shows ray tracing of incident light within the catadioptric optical system of FIG. 1A. In the embodiment, the catadioptric optical system comprises in sequence of ray tracing a first mirrors group 10 with positive diopter and constituted by Ritchey-Chrétien type hyperbolic mirrors including a concave primary mirror 110 having a central through hole 112 and a convex secondary mirror 120, both of a concave reflective mirror surface 111 of the primary mirror 110 and a convex reflective mirror surface 121 of the secondary mirror 120 being aspheric; and a second corrector lens group 20 with negative diopter positioned at an image side of the first mirrors group 10 and from the image side of the first mirrors group 10 in order including a first meniscus lens element 210 with positive refractive power having a convex object-side surface 211 and a concave image-side surface 212, both of the convex object-side surface 211 and the concave image-side surface 212 being spherical, and the first lens element 210 made of glass material; a second lens element 220 with negative refractive power having a concave object-side surface 221 and a concave image-side surface 222, both of the concave object-side surface 221 and the concave image-side surface 222 being spherical and the second lens element made of glass material, a third meniscus lens element with negative refractive power having a concave object-side surface 231 and a convex image-side surface 232, both of the concave object-side surface 231 and the convex image-side surface 232 being spherical and the third lens element made of glass material; and a fourth lens element 240 with positive refractive power having a convex object-side surface 241 and a convex image-side surface 242, both of the convex object-side surface 241 and the convex image-side surface 242 being spherical and the fourth lens element 240 made of glass material.

A third reflective surfaces group 30 is positioned at an image side of the second corrector lens group 20 and includes a first reflective surface 310 and a second reflective surface 320, a contained angle is between the first reflective surface 310 and the second reflective surface 320, an apex 300 of the contained angle is positioned at an optical axis OO' of the catadioptric optical system and faces toward the second corrector lens group 20.

A fourth image sensing group includes a first image sensing device 40 and a second image sensing device 42 respectively placed at corresponding image surfaces of the present catadioptric optical system, which are located at an image side of the first reflective surface 310 and an image side of the second reflective surface 320. In various implements of the present invention, the first image sensing device 40 can be a linear image sensing device and the second image sensing device 42 can be an area-array image sensing device.

The optical data of five implements of the present catadioptric optical system of FIG. 1A are described in Table I through Table V.

TABLE I

| | | | | | Refractive | Abbe | Effective |
|---|---|---|---|---|---|---|---|
| | | | | | | | EFL(mm) = 2244 |
| Surface | | Curvature radius (mm) | Conic constant | Thickness (mm) | index (nd) | number (vd) | focal length (EFL) |
| 111 | Spherical conic surface | −1088.749 | −1.220708721 | −375.99 | | | −544.37 |
| 121 | Spherical conic surface | −476.837 | −5.500907062 | 418.30 | | | −238.42 |
| 211 | Spherical surface | 158.455 | | 17.19 | 1.46 | 67.8 | 454.88 |
| 212 | Spherical surface | 645.910 | | 43.27 | | | |
| 221 | Spherical surface | −96.672 | | 6.25 | 1.46 | 67.8 | −108.59 |
| 222 | Spherical surface | 103.816 | | 9.10 | | | |
| 231 | Spherical surface | −113.502 | | 10.71 | 1.46 | 67.8 | −283.02 |
| 232 | Spherical surface | −961.309 | | 3.05 | | | |
| 241 | Spherical surface | 203.721 | | 22.39 | 1.46 | 67.8 | 142.19 |
| 242 | Spherical surface | −91.987 | | 20.00 | | | |
| 310 | First reflective surface | infinite | | — | | | — |
| 320 | Second reflective surface | infinite | | — | | | |

TABLE II

| | | | | | Refractive | Abbe | Effective |
|---|---|---|---|---|---|---|---|
| | | | | | | | EFL(mm) = 3366 |
| Surface | | Curvature radius (mm) | Conic constant | Thickness (mm) | index (nd) | number (vd) | focal length (mm) |
| 111 | Spherical conic surface | −1633.106 | −1.213719458 | −564.00 | | | −816.55 |
| 121 | Spherical conic surface | −715.280 | −5.437490816 | 628.50 | | | −357.64 |
| 211 | Spherical surface | 238.352 | | 19.86 | 1.46 | 67.8 | 681.93 |
| 212 | Spherical surface | 990.329 | | 65.09 | | | |
| 221 | Spherical surface | −147.858 | | 6.02 | 1.46 | 67.8 | −163.62 |
| 222 | Spherical surface | 152.887 | | 13.62 | | | |
| 231 | Spherical surface | −134.836 | | 14.93 | 1.46 | 67.8 | −464.38 |
| 232 | Spherical surface | −383.284 | | 4.17 | | | |
| 241 | Spherical surface | 406.209 | | 25.67 | 1.46 | 67.8 | 219.76 |
| 242 | Spherical surface | −130.601 | | 45.00 | | | |
| 310 | First reflective surface | Infinite | | — | | | — |
| 320 | Second reflective surface | Infinite | | — | | | |

TABLE III

| | | | | | Refractive | Abbe | Effective |
|---|---|---|---|---|---|---|---|
| Surface | Radius curvature (mm) | | Conic constant | Thickness (mm) | index (nd) | number (vd) | focal length (mm) |
| | | | EFL(mm) = 4488 | | | | |
| 111 | Spherical conic surface | −2177.343 | −1.204980904 | −752.06 | | | −1088.67 |
| 121 | Spherical conic surface | −953.934 | −5.363546473 | 840.16 | | | −476.97 |
| 211 | Spherical surface | 318.001 | | 19.88 | 1.46 | 67.8 | 908.29 |
| 212 | Spherical surface | 1337.390 | | 87.04 | | | |
| 221 | Spherical surface | −201.209 | | 6.65 | 1.46 | 67.8 | −217.45 |
| 222 | Spherical surface | 197.980 | | 18.20 | | | |
| 231 | Spherical surface | −156.538 | | 19.20 | 1.46 | 67.8 | −680.98 |
| 232 | Spherical surface | −327.413 | | 5.74 | | | |
| 241 | Spherical surface | 730.741 | | 28.93 | 1.46 | 67.8 | 300.29 |
| 242 | Spherical surface | −166.657 | | 45.00 | | | |
| 310 | First reflective surface | Infinite | | — | | | — |
| 320 | Second reflective surface | Infinite | | — | | | |

TABLE IV

| | | | | | Refractive | Abbe | Effective |
|---|---|---|---|---|---|---|---|
| Surface | Curvature radius (mm) | | Conic constant | Thickness (mm) | index (nd) | number (vd) | focal length (mm) |
| | | | EFL(mm) = 5610 | | | | |
| 111 | Spherical conic surface | −2721.783 | −1.174198069 | −940.08 | | | −1360.89 |
| 121 | Spherical conic surface | −1192.018 | −5.039033272 | 1062.85 | | | −596.01 |
| 211 | Spherical surface | 424.777 | | 20.35 | 1.46 | 67.8 | 1115.25 |
| 212 | Spherical surface | 2524.751 | | 110.08 | | | |
| 221 | Spherical surface | −291.321 | | 19.26 | 1.46 | 67.8 | −257.93 |
| 222 | Spherical surface | 201.745 | | 24.91 | | | |
| 231 | Spherical surface | −177.081 | | 20.00 | 1.46 | 67.8 | −887.18 |
| 232 | Spherical surface | −325.784 | | 11.87 | | | |
| 241 | Spherical surface | 660.495 | | 33.26 | 1.46 | 67.8 | 362.55 |
| 242 | Spherical surface | −217.383 | | 45.00 | | | |
| 310 | First reflective surface | Infinite | | — | | | — |
| 320 | Second reflective surface | Infinite | | — | | | |

TABLE V

EFL(mm) = 6732

| Surface | | Curvature radius (mm) | Conic constant | Thickness (mm) | Refractive index (nd) | Abbe number (vd) | Effective focal length (mm) |
|---|---|---|---|---|---|---|---|
| 111 | Spherical conic surface | −3266.086 | −1.16201498 | −1128.18 | | | −1633.04 |
| 121 | Spherical conic surface | −1430.321 | −4.915618217 | 1289.51 | | | −715.16 |
| 211 | Spherical surface | 552.964 | | 21.41 | 1.46 | 67.8 | 1325.23 |
| 212 | Spherical surface | 6348.860 | | 133.46 | | | |
| 221 | Spherical surface | −337.652 | | 15.44 | 1.46 | 67.8 | −304.48 |
| 222 | Spherical surface | 239.664 | | 30.92 | | | |
| 231 | Spherical surface | −191.216 | | 20.00 | 1.46 | 67.8 | −1260.53 |
| 232 | Spherical surface | −295.756 | | 23.92 | | | |
| 241 | Spherical surface | 1060.753 | | 36.88 | 1.46 | 67.8 | 447.82 |
| 242 | Spherical surface | −250.495 | | 45.00 | | | |
| 310 | First reflective surface | Infinite | | — | | | — |
| 320 | Second reflective surface | Infinite | | — | | | |

In the implements of Table I through Table V, with the implement of Table I as an example for explanation: the numberings of "Surface" column correspond element numerals shown in the drawings, "Thickness" column represents an on-axis air (vacuum) gap between adjacent lens surfaces or a lens element thickness, for instance −375.99 mm means an air (vacuum) gap on the optical axis OO' between the concave reflective mirror surface 111 and the convex reflective mirror surface 121, 418.30 mm means an air (vacuum) gap on the optical axis between the convex reflective surface 121 and the object-side surface 211 of the first lens element 210, 17.19 mm means a thickness of the first lens element 210, and so on. Besides, in the implement of Table I, a distance between the first reflective surface 310 and the corresponding image surface of the present catadioptric optical system is 41.05 mm, a distance between the second reflective surface 320 and the corresponding image surface of the present catadioptric optical system is also 41.05 mm; in the implement of Table II, a distance between the first reflective surface 310 and the corresponding image surface of the present catadioptric optical system is 67.04 mm, a distance between the second reflective surface 320 and the corresponding image surface of the present catadioptric optical system is also 67.04 mm; in the implement of Table III, a distance between the first reflective surface 310 and the corresponding image surface of the present catadioptric optical system is 116.51 mm, a distance between the second reflective surface 320 and the corresponding image surface of the present catadioptric optical system is also 116.51 mm; in the implement of Table IV, a distance between the first reflective surface 310 and the corresponding image surface of the present catadioptric optical system is 136.48 mm, a distance between the second reflective surface 320 and the corresponding image surface of the present catadioptric optical system is also 136.48 mm; in the implement of Table V, a distance between the first reflective surface 310 and the corresponding image surface of the present catadioptric optical system is 161.97 mm, a distance between the second reflective surface 320 and the corresponding image surface of the present catadioptric optical system is also 161.97 mm.

In the embodiment, a diopter of the catadioptric optical system is DW, a diopter of the second corrector lens group is DL, and the following condition is satisfied:

$$\frac{DL}{DW} = (P_4 EFL^4 + P_3 EFL^3 + P_2 EFL^2 + P_1 EFL + P_0) * (1 \pm 10\%);$$

wherein, $P_0 = -4.95 * 10^{-1}$, $P_1 = -1.81 * 10^{-3}$, $P_2 = 5.59 * 10^{-7}$, $P_3 = -7.76 * 10^{-11}$, $P_4 = 4.4 * 10^{-15}$, EFL is an effective focal length of the catadioptric optical system, and (±10%) means a tolerance allowance range of the present catadioptric optical system under an actual measure.

In the embodiment, a diopter of the first lens element is DL1, a diopter of the second lens element is DL2, a diopter of the third lens element is DL3, a diopter of the fourth lens element is DL4, and the following conditions are satisfied:

$$\frac{DL1}{DL} = (K_4 EFL^4 + K_3 EFL^3 + K_2 EFL^2 + K_1 EFL + K_0) * (1 \pm 10\%);$$

wherein, $K_0 = -3.32$, $K_1 = 1.23 * 10^{-3}$, $K_2 = -3.86 * 10^{-7}$, $K_3 = 5.68 * 10^{-11}$, $K_4 = -3.56 * 10^{-15}$, $$\frac{DL2}{DL} = (L_4 EFL^4 + L_3 EFL^3 + L_2 EFL^2 + L_1 EFL + L_0) * (1 \pm 10\%);$$

wherein, $L_0 = 9.82$, $L_1 = -4.91 * 10^{-4}$, $L_2 = -2.48 * 10^{-7}$, $L_3 = 7.24 * 10^{-11}$, $L_4 = -3.11 * 10^{-15}$, $$\frac{DL3}{DL} = (M_4 EFL^4 + M_3 EFL^3 + M_2 EFL^2 + M_1 EFL + M_0) * (1 \pm 10\%);$$

wherein, $M_0 = 2.74$, $M_1 = 1.32 * 10^{-3}$, $M_2 = -8.02 * 10^{-7}$, $M_3 = 1.53 * 10^{-10}$, $M_4 = -9.43 * 10^{-15}$, $$\frac{DL4}{DL} = (N_4 EFL^4 + N_3 EFL^3 + N_2 EFL^2 + N_1 EFL + N_0) * (1 \pm 10\%);$$

wherein, $N_0 = -5.99$, $N_1 = -1.52 * 10^{-3}$, $N_2 = 1 * 10^{-6}$, $N_3 = -1.95 * 10^{-10}$, $N_4 = 1.11 * 10^{-14}$, EFL is an effective focal length of the catadioptric optical system, and (±10%) means a tolerance allowance range of the present catadioptric optical system under an actual measure.

In the embodiment, a composite diopter of the first lens element and the second lens element is DL12, a composite diopter of the second lens element and the third lens element is DL23, and a composite diopter of the third lens element and the fourth lens element is DL34, and the following conditions are satisfied: DL12

$$\frac{DL12}{DL} = (R_4 EFL^4 + R_3 EFL^3 + R_2 EFL^2 + R_1 EFL + R_0) * (1 \pm 10\%);$$

wherein, $R_0 = 6.05$, $R_1 = -2.7 * 10^{-4}$, $R_2 = -1.43 * 10^{-7}$, $R_3 = 4.21 * 10^{-11}$, $R_4 = -1.66 * 10^{-15}$, $$\frac{DL23}{DL} = (S_4 EFL^4 + S_3 EFL^3 + S_2 EFL^2 + S_1 EFL + S_0) * (1 \pm 10\%);$$

wherein, $S_0 = 11.7$, $S_1 = 2.38 * 10^{-3}$, $S_2 = -1.74 * 10^{-6}$, $S_3 = 3.46 * 10^{-10}$, $S_4 = -1.98 * 10^{-14}$, $$\frac{DL34}{DL} = (T_4 EFL^4 + T_3 EFL^3 + T_2 EFL^2 + T_1 EFL + T_0) * (1 \pm 10\%);$$

wherein, $T_0 = -4.23$, $T_1 = 1.66 * 10^{-4}$, $T_2 = 1.16 * 10^{-7}$, $T_3 = -3.25 * 10^{-11}$, $T_4 = 1.2 * 10^{-15}$, EFL is an effective focal length of the catadioptric optical system, and (±10%) means a tolerance allowance range of the present catadioptric optical system under an actual measure.

Please refer to FIG. 1B, when the incident light projects unto the primary mirror 110, the incident light is reflected and converging to the secondary mirror 120, then reflected again and passing the central hole 112 of the primary mirror 110, and then projecting unto the second corrector lens group 20. The incident light is corrected by the second corrector lens group 20 to become corrected beams with small chief ray angles. Then, the corrected beams with small chief ray angles project unto the first reflective surface 310 and the second reflective surface 320 of the third reflective surfaces group 30. Then, the corrected beams are split and reflected by the first reflective surface 310 and the second reflective surface 320 and being focused unto focal planes of the first image sensing device 40 and the second image sensing device 42. In the implements of the present invention, the first image sensing device 40 can be a linear image sensing device and the second image sensing device 42 can be an area-array image sensing device.

Figure 2:
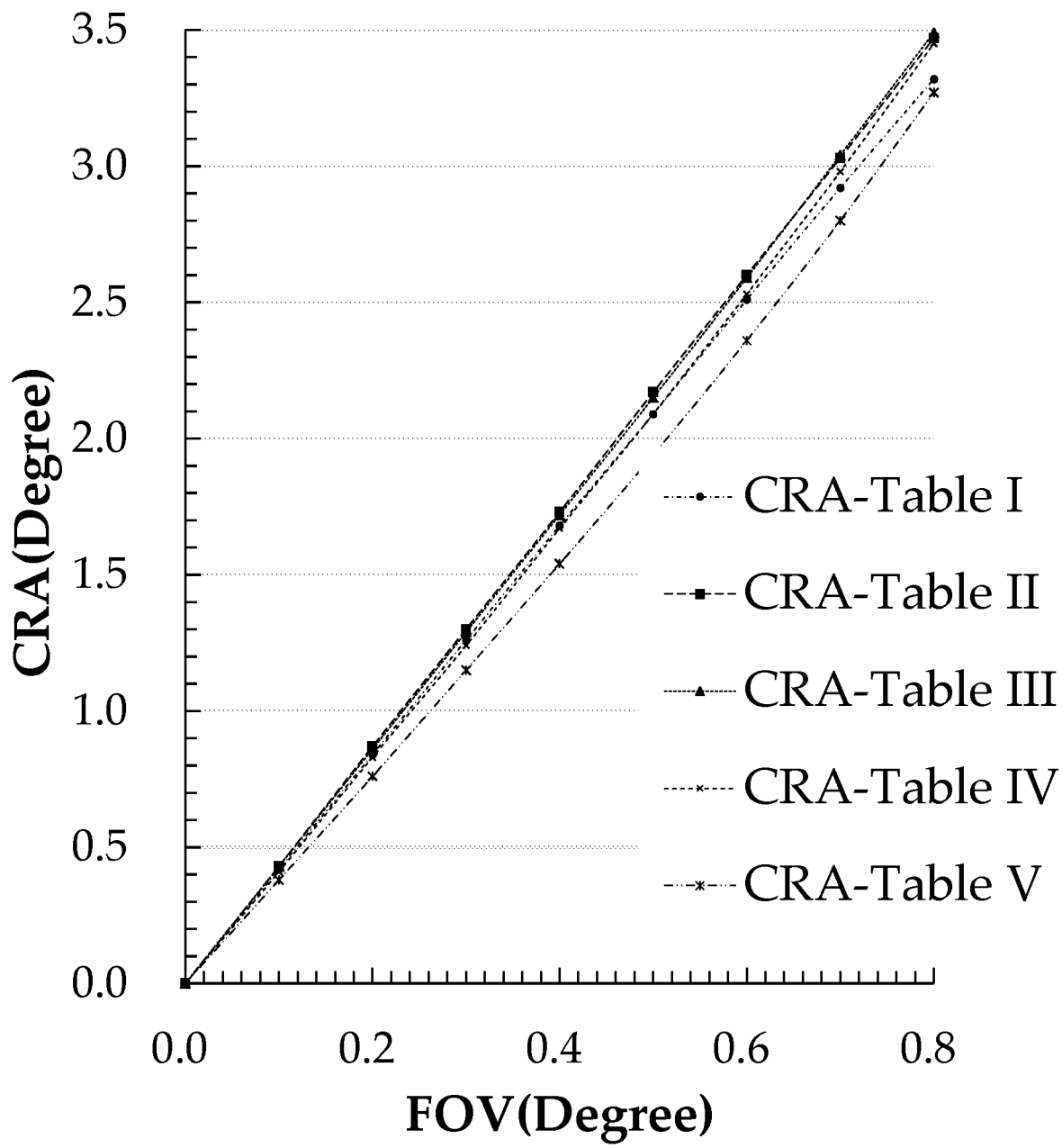
FIG. 2 is a relation diagram of chief ray angles vs. field of views of corrected beams from the catadioptric optical system of FIG. 1A.

Table VI shows a correlation between field of views vs. chief ray angles of the corrected beams of the present catadioptric optical systems in the implements corresponding to Table I through Table V. FIG. 2 is a relation diagram of the chief ray angles vs. the field of views of the corrected beams. It is clearly seen the present catadioptric optical system has capability to correct the incident light to become corrected beams with chief ray angles less than 3.5 degrees. The present catadioptric optical system is suitable for a Ritchey-Chrétien type telescope with small chief ray angles, which is adaptable for a satellite remote-sensing images instrument.

TABLE VI

| FOV (degree) | CRA-Table I | CRA-Table II | CRA-Table III | CRA-Table IV | CRA-Table V |
|---|---|---|---|---|---|
| 0.0 | 0.00 | 0.00 | 0.00 | 0.00 | 0.00 |
| 0.1 | 0.42 | 0.43 | 0.43 | 0.41 | 0.38 |
| 0.2 | 0.84 | 0.87 | 0.86 | 0.83 | 0.76 |
| 0.3 | 1.26 | 1.30 | 1.29 | 1.24 | 1.15 |
| 0.4 | 1.68 | 1.73 | 1.72 | 1.67 | 1.54 |
| 0.5 | 2.09 | 2.17 | 2.15 | 2.09 | 1.94 |
| 0.6 | 2.51 | 2.60 | 2.59 | 2.53 | 2.36 |
| 0.7 | 2.92 | 3.03 | 3.04 | 2.98 | 2.80 |
| 0.8 | 3.32 | 3.47 | 3.49 | 3.45 | 3.27 |

It is to be noted that Table I through Table V show optical data of the different implements. However, the data of the different implements are obtained from experiments. The implements depicted above and the appended drawings are exemplary and are not intended to be exhaustive or to limit the scope of the present disclosure to the precise forms disclosed. Many modifications and variations are possible in view of the above teachings.

What is claimed is:

1. A catadioptric optical system, comprising in sequence of ray tracing:
   a first mirrors group of Ritchey-Chrétien type hyperbolic mirrors with positive diopter including a concave primary mirror having a central through hole and a convex secondary mirror; and
   a second corrector lens group with negative diopter positioned at an image side of the first mirrors group and from the image side of the first mirrors group in order including a first meniscus lens element having positive refractive power and a convex object-side surface, a second lens element with negative refractive power having a concave object-side surface and a concave image-side surface, a third meniscus lens element having negative refractive power and a concave object-side surface, and a fourth lens element with positive refractive power having a convex object-side surface and a convex image-side surface;
   wherein a diopter of the whole catadioptric optical system is DW, a diopter of the second corrector lens group is DL, and the following condition is satisfied:

$$\frac{DL}{DW} = (P_4 EFL^4 + P_3 EFL^3 + P_2 EFL^2 + P_1 EFL + P_0) * (1 \pm 10\%);$$

wherein $P_0 = -4.95 * 10^{-1}$;

$P_1 = -1.81 * 10^{-3}$;

$P_2 = 5.59 * 10^{-7}$;

$P_3 = -7.76 * 10^{-11}$;

$P_4 = 4.4 * 10^{-15}$; and

EFL is an effective focal length of the catadioptric optical system.

2. The catadioptric optical system of claim 1, wherein the first lens element is constituted of a singular lens element and has an image-side surface being concave.

3. The catadioptric optical system of claim 1, wherein the third lens element is constituted of a singular lens element and has an image-side surface being convex.

4. The catadioptric optical system of claim 1, wherein a diopter of the first lens element is DL1, a diopter of the second lens element is DL2, a diopter of the third lens element is DL3, a diopter of the fourth lens element is DL4, and the following conditions are satisfied:

$$\frac{DL1}{DL} = (K_4 EFL^4 + K_3 EFL^3 + K_2 EFL^2 + K_1 EFL + K_0) * (1 \pm 10\%);$$

wherein $K_0 = -3.32$;

$K_1 = 1.23 * 10^{-3}$;

$K_2 = -3.86 * 10^{-7}$;

$K_3 = 5.68 * 10^{-11}$;

$K_4 = -3.56 * 10^{-15}$;

$$\frac{DL2}{DL} = (L_4 EFL^4 + L_3 EFL^3 + L_2 EFL^2 + L_1 EFL + L_0) * (1 \pm 10\%);$$

wherein $L_0 = 9.82$;

$L_1 = -4.91 * 10^{-4}$;

$L_2 = -2.48 * 10^{-7}$;

$L_3 = 7.24 * 10^{-11}$;

$L_4 = -3.11 * 10^{-15}$;

$$\frac{DL3}{DL} = (M_4 EFL^4 + M_3 EFL^3 + M_2 EFL^2 + M_1 EFL + M_0) * (1 \pm 10\%);$$

wherein $M_0 = 2.74$;

$M_1 = 1.32 * 10^{-3}$;

$M_2 = -8.02 * 10^{-7}$;

$M_3 = 1.53 * 10^{-10}$;

$M_4 = -9.43 * 10^{-15}$;

$$\frac{DL4}{DL} = (N_4 EFL^4 + N_3 EFL^3 + N_2 EFL^2 + N_1 EFL + N_0) * (1 \pm 10\%);$$

wherein $N_0 = -5.99$;

$N_1 = -1.52 * 10^{-3}$;

$N_2 = 1 * 10^{-6}$;

$N_3 = -1.95*10^{-10}$;

$N_4 = 1.11*10^{-14}$; and

EFL is an effective focal length of the catadioptric optical system.

5. The catadioptric optical system of claim 4, wherein a composite diopter of the first lens element and the second lens element is DL12, a composite diopter of the second lens element and the third lens element is DL23, and a composite diopter of the third lens element and the fourth lens element is DL34, and the following conditions are satisfied:

$$\frac{DL12}{DL} = (R_4 EFL^4 + R_3 EFL^3 + R_2 EFL^2 + R_1 EFL + R_0)*(1 \pm 10\%);$$

wherein $R_0 = 6.05$;

$R_1 = -2.7*10^{-4}$;

$R_2 = -1.43*10^{-7}$;

$R_3 = 4.21*10^{-11}$;

$R_4 = -1.66*10^{-15}$;

$$\frac{DL23}{DL} = (S_4 EFL^4 + S_3 EFL^3 + S_2 EFL^2 + S_1 EFL + S_0)*(1 \pm 10\%);$$

wherein $S_0 = 11.7$;

$S_1 = 2.38*10^{-3}$;

$S_2 = -1.74*10^{-6}$;

$S_3 = 3.46*10^{-10}$;

$S_4 = -1.98*10^{-14}$;

$$\frac{DL34}{DL} = (T_4 EFL^4 + T_3 EFL^3 + T_2 EFL^2 + T_1 EFL + T_0)*(1 \pm 10\%);$$

wherein $T_0 = -4.23$;

$T_1 = 1.66*10^{-4}$;

$T_2 = 1.16*10^{-7}$;

$T_3 = -3.25*10^{-11}$;

$T_4 = 1.2*10^{-15}$; and

EFL is an effective focal length of the catadioptric optical system.

6. The catadioptric optical system of claim 1, wherein the first lens element, the second lens element, the third lens element and the fourth lens element are made of the same optical material.

7. The catadioptric optical system of claim 6, wherein the first lens element, the second lens element, the third lens element and the fourth lens element are made of glass material, a refractive index of the glass material is nd, an Abbe number of the glass material is vd, and the following conditions are satisfied:

$1.44 < nd < 1.47$; and $64.41 < vd < 71.19$.

8. The catadioptric optical system of claim 6, further comprising a third reflective surfaces group and a fourth image sensing group, wherein the third reflective surfaces group is positioned at an image side of the second corrector lens group and includes a first reflective surface and a second reflective surface, a contained angle is between the first reflective surface and the second reflective surface, an apex of the contained angle is positioned at an optical axis of the catadioptric optical system and faces toward the second corrector lens group, the fourth image sensing group includes a first image sensing device and a second image sensing device respectively placed at an image side of the first reflective surface and an image side of the second reflective surface.

9. The catadioptric optical system of claim 8, wherein a distance on the optical axis between the convex object-side surface of the first lens element facing toward the convex secondary mirror and the convex image-side surface of the fourth lens element facing toward the third reflective surfaces group is TLL1L4, and the following condition is satisfied:

$TLL1L4 = (U_4 EFL^4 + U_3 EFL^3 + U_2 EFL^2 + U_1 EFL + U_0)*(1 \pm 10\%)$;

wherein $U_0 = -2.85*10^2$;

$U_1 = 3.87*10^{-1}$;

$U_2 = -1.37*10^{-4}$;

$U_3 = 2.23*10^{-8}$;

$U_4 = -1.28*10^{-12}$; and

EFL is an effective focal length of the catadioptric optical system.

10. The catadioptric optical system of claim 1, wherein a chief ray angle of a corrected beam of the incident light corrected through the catadioptric optical system is CRA, and the following condition is satisfied:

$CRA < 3.5$ degrees.

* * * * *